No. 659,213. Patented Oct. 9, 1900.
C. W. DEHN.
MITER MACHINE.
(Application filed Nov. 7, 1898.)
(No Model.)
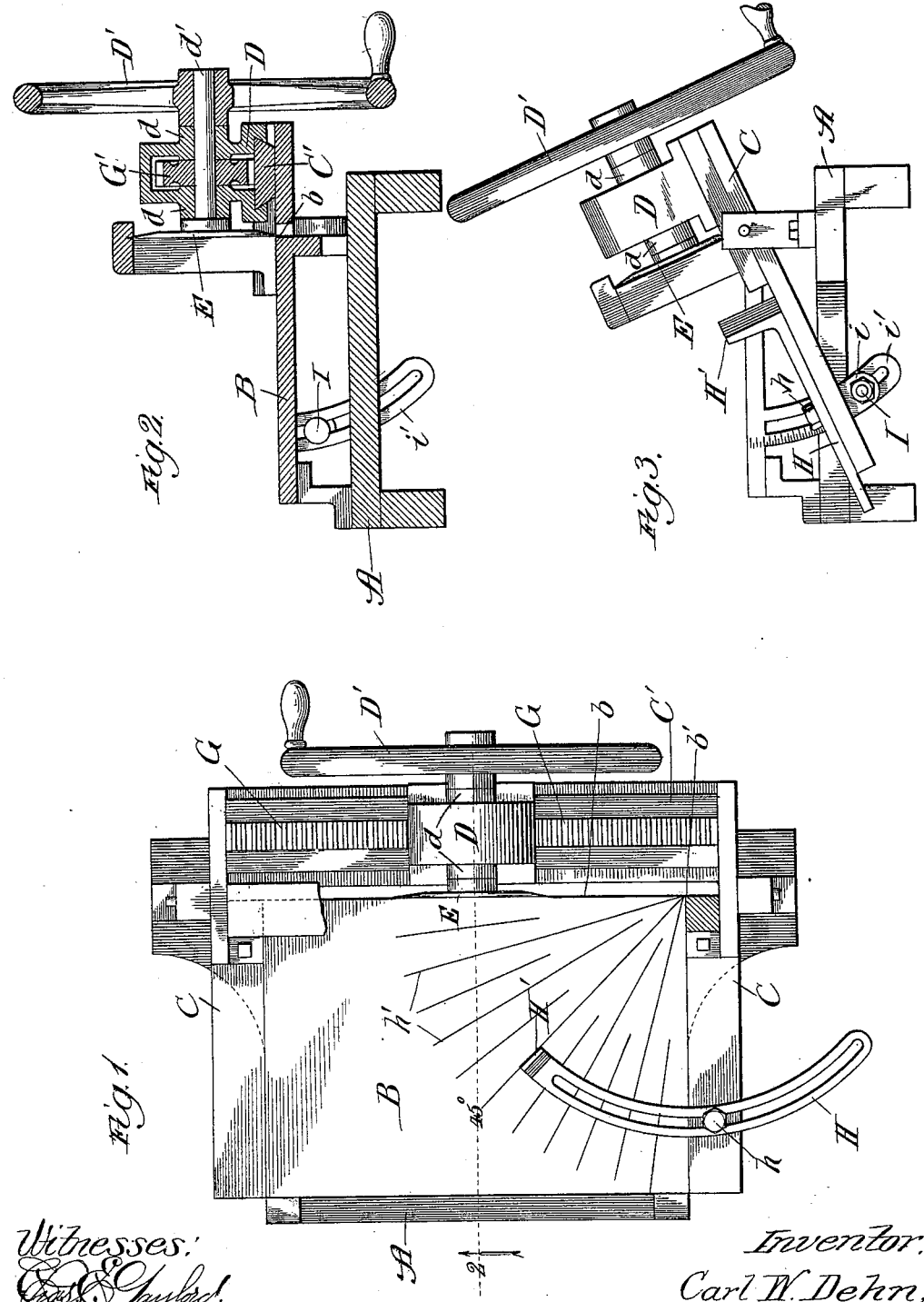
Inventor:
Carl W. Dehn,

UNITED STATES PATENT OFFICE.

CARL W. DEHN, OF TOPEKA, KANSAS.

MITER-MACHINE.

SPECIFICATION forming part of Letters Patent No. 659,213, dated October 9, 1900.

Application filed November 7, 1898. Serial No. 695,761. (No model.)

*To all whom it may concern:*

Be it known that I, CARL W. DEHN, a citizen of the United States, residing at Topeka, in the county of Shawnee and State of Kansas, have invented certain new and useful Improvements in Trimming and Miter Machines, of which the following is a specification.

My invention relates to that class of machines which is used for trimming and cutting boards and similar material at an angle to their surface or sides.

The object of the invention is to provide a simple, economical, and efficient trimmer and miter machine; and the invention consists in the features, combinations, and details of construction hereinafter described and claimed.

In the accompanying drawings, Figure 1 is a plan view of a machine constructed in accordance with my improvements; Fig. 2, a transverse sectional elevation taken on line 2 of Fig. 1; and Fig. 3, an end view of the machine, showing the cutter at an angle to the table or support for the purpose of trimming the edge of a board or similar material.

It will be noticed on examining the drawings that the cutter E is larger in diameter than the pinion G', which moves the head-stock, so that the periphery of the cutter when in action will have a relatively-faster rotation than the periphery of the toothed pinion. In this way the direction of the cutting edge in the block or board is almost perpendicular to the movement and enables the mechanism to accomplish better results.

In constructing a machine in accordance with my improvements I make a frame portion A of the desired size, shape, and strength to hold the operating and other parts in position. Supported upon this frame portion is a fixed table B, which is practically rigidly secured to the frame portion, so as to retain a horizontal position. Secured to this frame portion is a tilting or pivotal frame C, provided with a way or slide C', on which is slidingly mounted a head-stock D. The head-stock is provided with bearing portions $d$, in which is rotatably mounted a cutter spindle or shaft $d'$, carrying a hand-wheel D' at one end and a cutter E at or near the opposite end. The head-stock is moved back and forth on the slide by means of a rack G and pinion G', having toothed engagement with each other, the pinion being fixedly mounted on the cutter-spindle $d'$.

To trim or miter a board, the cutter is arranged adjacent to one edge $b$ of the table, so that it enters a slot $b'$ between the table and the slide. When the parts are in the position shown in Figs. 1 and 2, a board may be placed or clamped in position on the table and the cutter moved across the edge of the same, so as to trim it. When it is desired to give the board a mitered edge, a gage H is provided, which is preferably formed in the shape of a slotted segment and which is preferably held in position on the tilting frame by means of a screw $h$. The table is provided with a protractor or lines $h'$, converging into a common center, so that the gage may be set at any one of these lines to obtain any angle desired. The board is then laid against the lip H' of the gage and brought adjacent to the cutter, which is passed over the edge and acts to cut or trim it to the desired angle.

When it is desired to trim or miter the board at an angle to its face, the tilting frame is swung to the desired angle, as shown particularly in Fig. 3, and held in such position by means of the bolts and nuts I, which have engagement with the lugs $i$ and $i'$ on the tilting and main frames, respectively. The cutter is then operated as above described and the edge of the board trimmed.

I claim—

1. In a trimming and miter machine, the combination of a fixed bed or plate, a tilting or swinging frame pivotally mounted in line with the inner edge of the fixed bed or table, a rotatable cutter carried by and traveled back and forth on the tilting or swinging frame in alinement with the inner edge of the fixed bed or table, and means for adjusting and holding the tilting or swinging frame and the rotatable cutter at any desired angle of inclination parallel to and at all times in center line with the inner edge of the bed or table, substantially as described.

2. In a trimming and miter machine, the combination of a fixed table, a tilting or swinging frame pivotally mounted in line with the inner edge of the fixed bed or table, a sliding head-stock mounted and traveled back and forth on the tilting or swinging frame, a revoluble shaft mounted in the head-stock, a cutter on the shaft having its cutting edge in alinement with the inner edge of the fixed bed or table, means for traveling the head-stock back and forth, and means for adjusting and holding the tilting or swinging frame and the rotatable cutter in any desired angle of inclination parallel to and at all times in center line with the inner edge of the bed or table, substantially as described.

3. In a trimming and miter machine, the combination of a fixed bed or table, a tilting or swinging bed or frame pivotally mounted in line with the inner edge of the fixed bed or table, a guide on the tilting or swinging frame, a sliding head-stock mounted and traveling back and forth on the guide, a revoluble shaft mounted in the sliding head-stock, a cutter on the shaft arranged adjacent to and in alinement with the inner edge of the fixed bed or table, and a handle on the shaft for rotating the cutter and simultaneously moving the head-stock, substantially as described.

4. In a trimming and miter machine, the combination of a fixed bed or table, a tilting or swinging frame pivotally mounted in line with the inner edge of the fixed bed or table, a guide on the tilting or swinging frame, a rack on the guide, a head-stock traveling on the guide, a revoluble spindle mounted in the head-stock, a cutter on the spindle arranged adjacent to and in alinement with the straight inner edge of the fixed bed or table, a pinion on the spindle engaging with the rack of the guide, and a shaft on the spindle to rotate the cutter and simultaneously move the head-stock back and forth, substantially as described.

5. In a trimming and miter machine, the combination of a fixed bed or table, a tilting or swinging frame pivotally mounted in line with the inner edge of the fixed bed or table, a guide on the tilting or swinging frame, a rack on the guide, a head-stock sliding on the guide, a revoluble spindle mounted in the head-stock, a cutter on the spindle arranged adjacent to and in alinement with the straight inner edge of the fixed bed or table, a pinion on the spindle engaging the rack of the guide, a handle on the spindle for rotating the cutter and moving the guide back and forth, and nut-and-bolt mechanism for adjusting and holding the tilting or swinging frame and the cutter in any desired angle of inclination to the fixed bed or table, substantially as described.

6. In a machine of the class described, the combination of a fixed bed or table, a tilting or swinging frame pivotally mounted in line with the inner edge of the fixed bed or table, a guide on the tilting or swinging frame, a rack on the guide, a head-stock sliding on the guide, a revoluble spindle mounted in the head-stock, a cutter on the spindle arranged adjacent to and in alinement with the straight inner edge of the fixed bed or table, a pinion on the spindle engaging the rack of the guide, a handle on the spindle for rotating the cutter and moving the head-stock back and forth, bevel protractor lines on the fixed bed or table, and a gage movably secured to one end of the tilting or swinging frame for guiding and holding the material to be operated upon at different angles in relation to the cutter, substantially as described.

7. In a trimming and miter machine, the combination of a fixed bed or table, a tilting or swinging frame pivotally mounted in line with the inner edge of the fixed bed or table, a space or slot between the adjacent side edges of the fixed bed or table and the tilting or swinging frame adapted to receive the edge of a cutter, a guide on the tilting or swinging frame, a rack on the guide, a movable head-stock mounted on the guide, a rotatable spindle mounted in the head-stock, a toothed pinion on the spindle engaging the rack on the guide, a circular cutter attached to the spindle and traveling in the axial line of the swinging frame and of larger diameter than the toothed pinion, and means for rotating the cutter-spindle and revolving the cutter and moving the head-stock back and forth, substantially as described.

8. In a trimming and miter machine, the combination of a fixed bed or table, a swinging or tilting frame pivoted on a line with the cutting edge of the table to swing in the arc of a circle around such edge centrally, and a revolving cutter traveling in the axial line of and carried by the tilting or swinging frame for changing the angle of cut, substantially as described.

CARL W. DEHN.

Witnesses:
G. E. STOLPE,
J. D. CODDINGTON.